G. W. DONNING.
TEMPORARY LINE ADJUSTING DEVICE FOR TYPE WRITERS.
APPLICATION FILED OCT. 30, 1908.
1,056,645.
Patented Mar. 18, 1913.
4 SHEETS—SHEET 1.
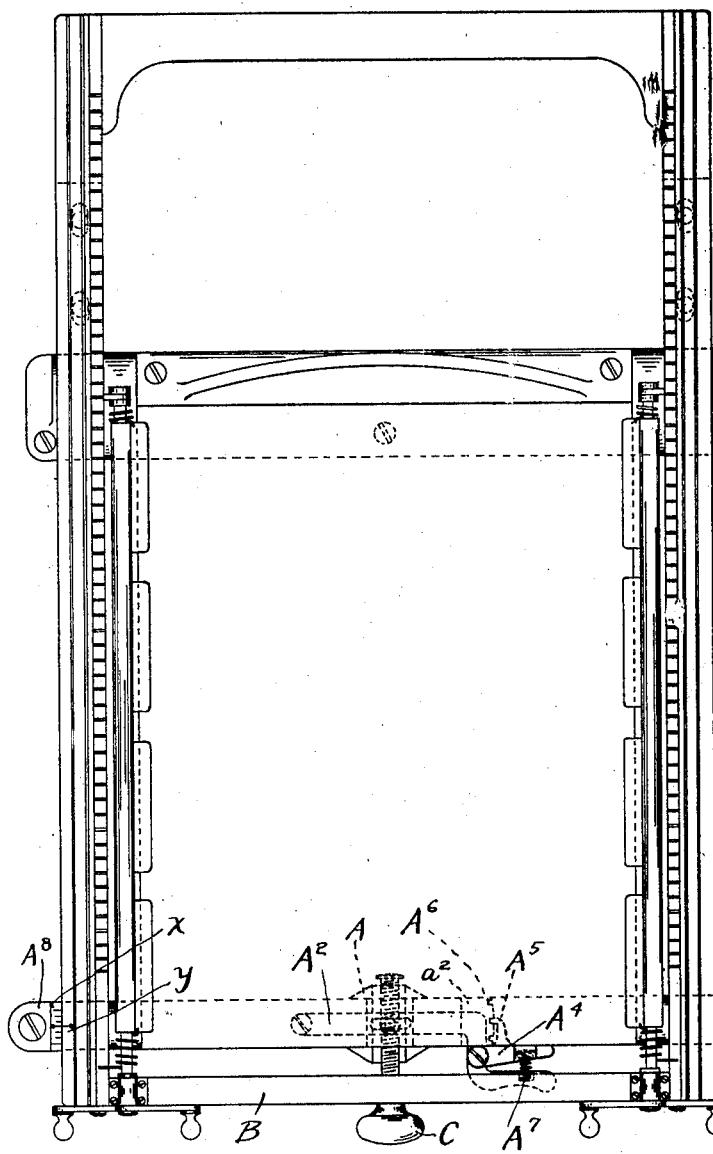
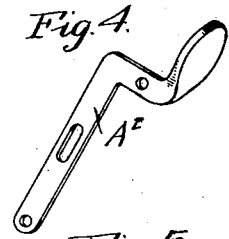
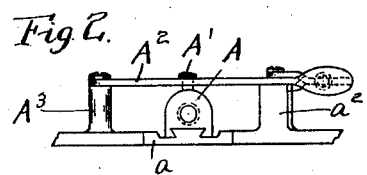
WITNESSES:
Harold E. Stonebraker
Agnes Quinn
INVENTOR:
George W. Donning
BY
His Attorneys

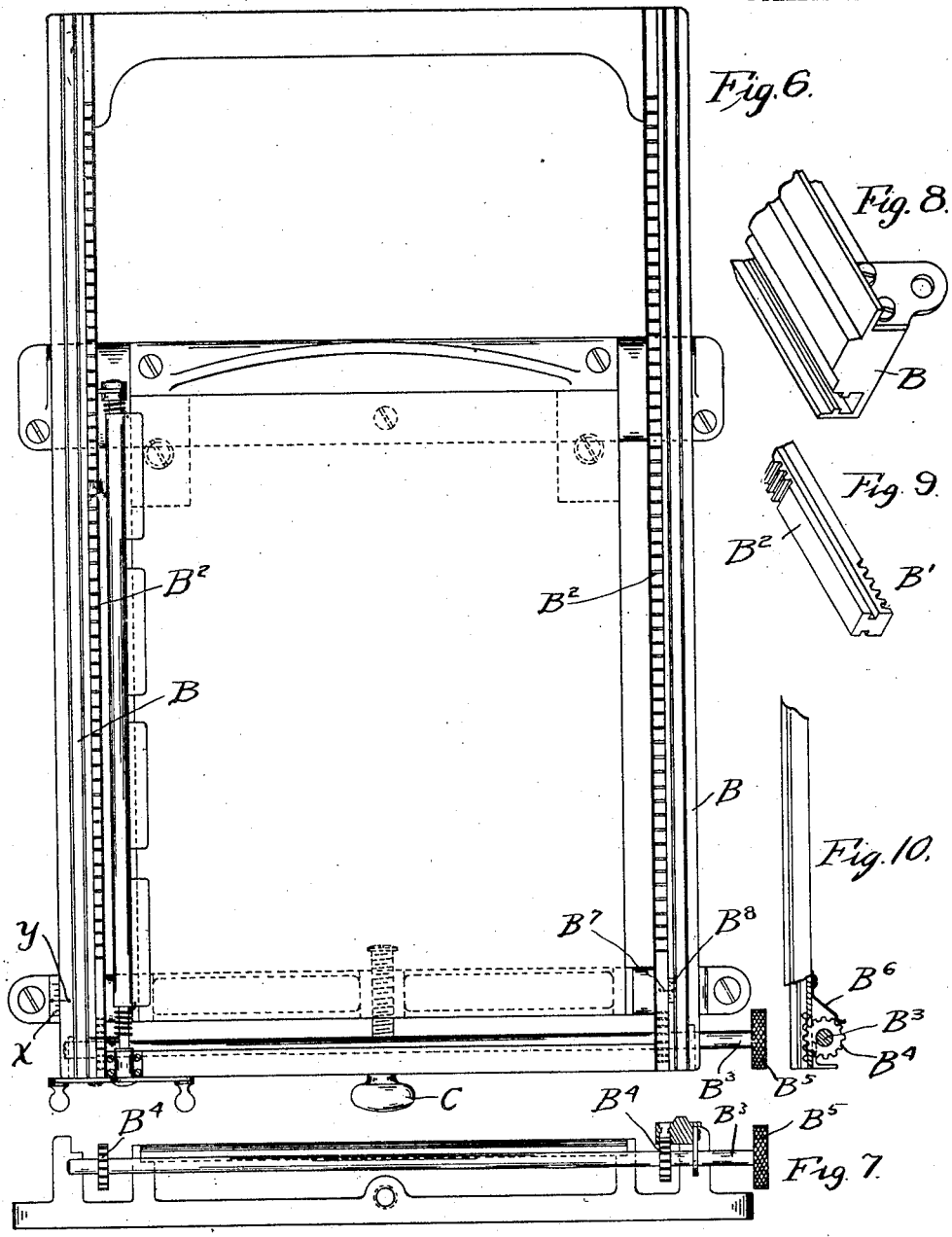

G. W. DONNING.
TEMPORARY LINE ADJUSTING DEVICE FOR TYPE WRITERS.
APPLICATION FILED OCT. 30, 1908.
1,056,645.
Patented Mar. 18, 1913.
4 SHEETS—SHEET 3.
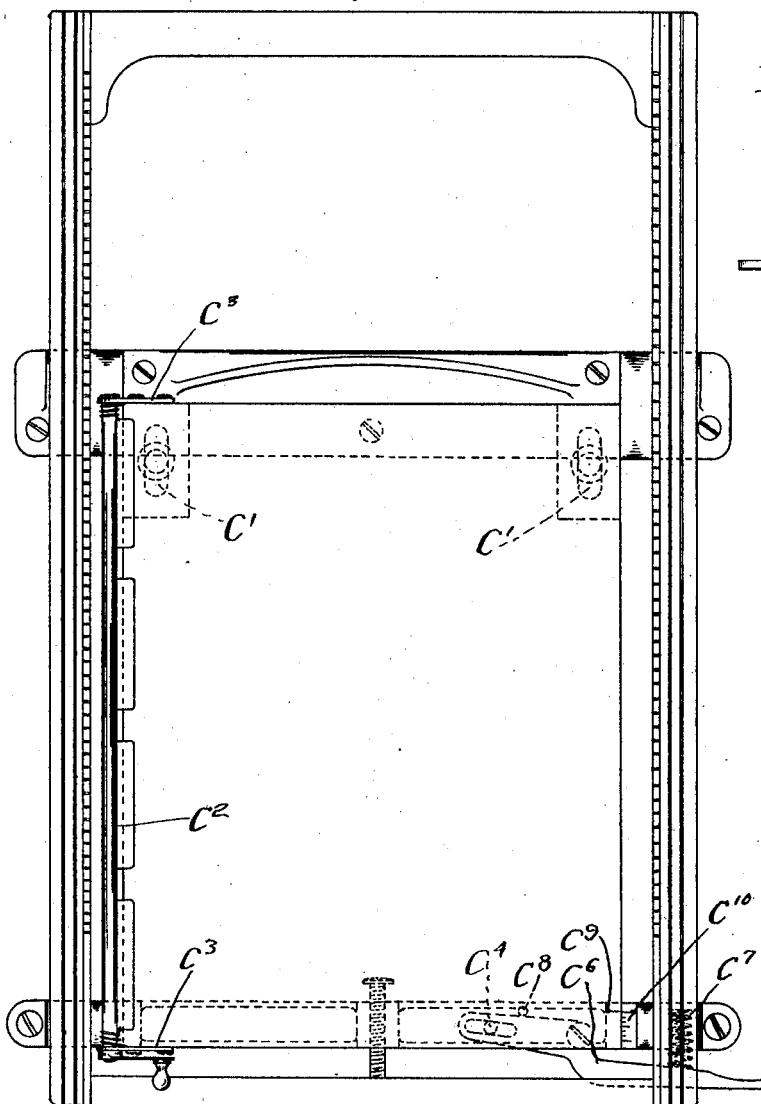
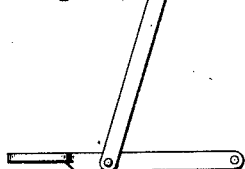
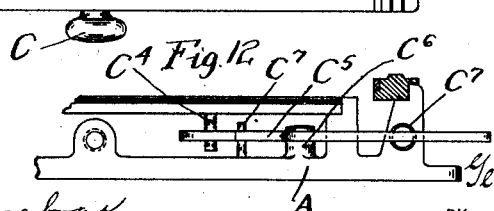
WITNESSES
Harold E. Stonebraker.
Agnes Quinn.
INVENTOR
George W. Donning
BY
Grenforth & Parry
HIS ATTORNEYS.

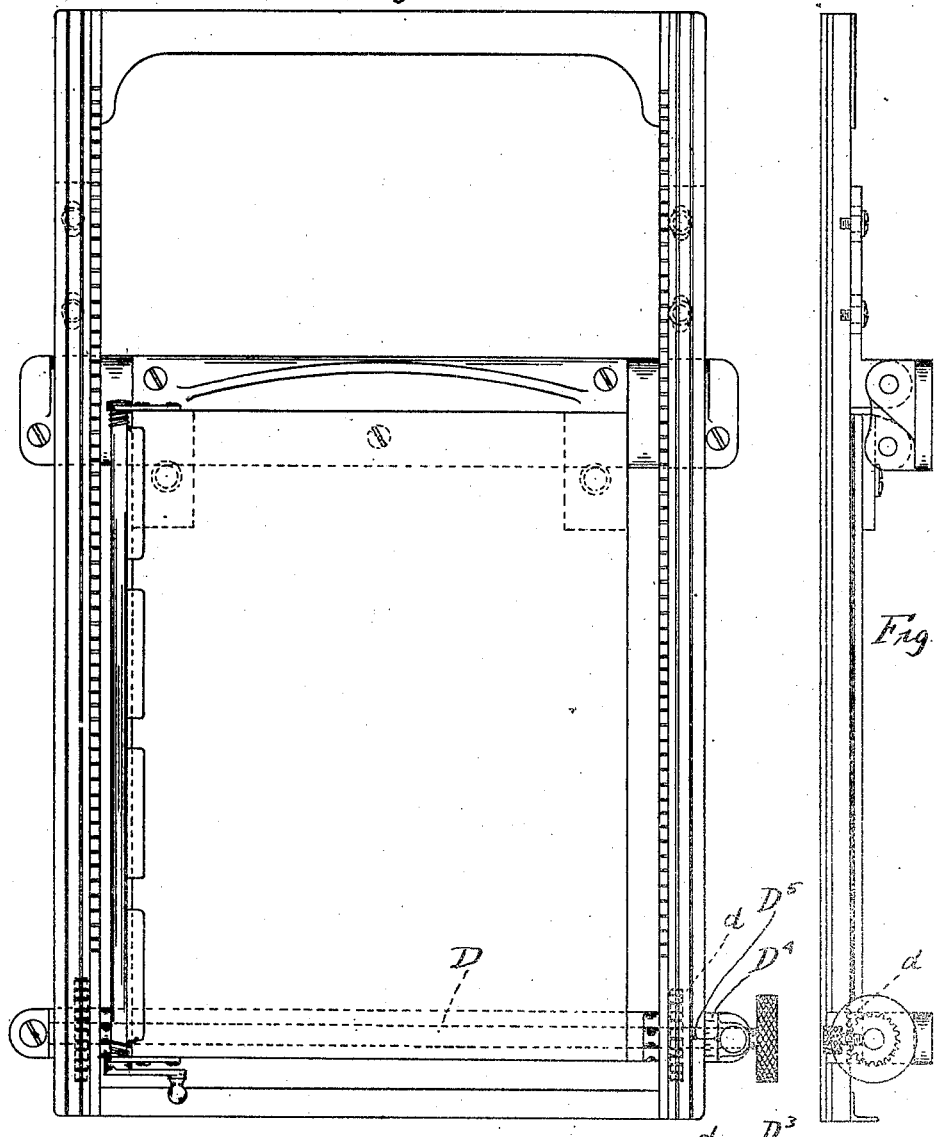

UNITED STATES PATENT OFFICE.

GEORGE W. DONNING, OF STAMFORD, CONNECTICUT, ASSIGNOR TO HARRY T. AMBROSE, OF ORANGE, NEW JERSEY.

TEMPORARY LINE-ADJUSTING DEVICE FOR TYPE-WRITERS.

1,056,645.  Specification of Letters Patent.  Patented Mar. 18, 1913.

Application filed October 30, 1908. Serial No. 460,289.

*To all whom it may concern:*

Be it known that I, GEORGE W. DONNING, a citizen of the United States, residing at Stamford, in the county of Fairfield and State of Connecticut, have invented certain new and useful Improvements in Temporary Line-Adjusting Devices for Type-Writers; and I do hereby declare the following to be a full, clear, and exact description of the invention, such as will enable others skilled in the art to which it appertains to make and use the same.

My invention relates to typewriting-machines, and more particularly to improvements in devices for obtaining a temporary relative adjustment of the machine and work, intermediate the regular line-spacing.

The purpose of the invention is, in a machine wherein there is a platen and an overlying writing-mechanism, to provide a means for temporarily shifting one or both of these members relative to each other, so as to position the same momentarily or temporarily out of normal position, to permit of the insertion of a letter, word, character, or the like intermediate the regular lines, either above or below the particular line being written; which invention may be used by itself or as an improvement on and in conjunction with the devices shown in my previous Patents, Nos. 753,190, February 24, 1904, 826,483, July 17, 1906, and 929,840, August 3, 1909; and, in some embodiments thereof, as hereinafter shown and described, the fine-line-adjusting-device of my said patents may form an integral and inseparable part of the present invention; see for instance Fig. 14 *et seq* of the present case.

In the several devices shown in the patents above referred to, I employ a device for obtaining a fine-line-adjustment for the purpose of properly positioning the writing mechanism, with relation to the work-sheet, independently of the regular line-spacing, and the present invention contemplates, in one aspect, a use independent thereof, and in a different aspect an addition to this device whereby the operator is enabled rapidly to shift the platen or the writing-mechanism or both momentarily or temporarily out of its properly alined position for interlineation, or for writing exponents, or other matter not in the usual alinement.

In my improvement already protected by patents and pending application, I employ, in connection with flat-platen typewriters, fine-line-adjusting-devices operating on the platen and on the track-frame, and my present invention is susceptible of use either where the fine line-adjusting device operates on the platen or on the track-frame; and in still another phase of the present improvement, I may combine the fine-line-adjusting-device with the temporary intermediate-line-spacing-device, obtaining both results by a single mechanism, all as more fully pointed out hereinafter in detail.

The invention is applicable to any form of typewriter, whether of the round-platen type or of the flat-platen type, although for convenience of illustration, I have disclosed the same here as applied to a flat-platen machine.

With these several objects and advantages in view, the invention, in its preferred embodiment, comprehends the several forms hereinafter fully set forth, pointed out in the claims, and illustrated in the accompanying drawings, in which—

Figure 1 is a top plan view of a track-frame and platen, provided with my improvement, in one of its forms, the same, in this instance, contemplating the shifting of the track-frame and, thus, of the writing-mechanism relative to the platen; Fig. 2 is a detail view in front elevation of a portion of the base, showing the adjacent block, and lever connected thereto; Fig. 3 is a detail view of the locking-latch; Fig. 4 is a detail view of the operating-lever; Fig. 5 is a detail view of the block; Fig. 6 is a top plan view of a track-frame and platen, provided with my improvement in another form, the same, in this instance, contemplating the shifting of the racks on the track-frame and, thus, the shifting of the writing-mechanism relative to the platen. Fig. 7 is an end elevation of the same; Fig. 8 is a detail view in perspective of a portion of one of the track-rails; Fig. 9 is a detail view of a portion of one of the racks to be slidingly mounted in the track-rails; Fig. 10 is a side view of one of the racks and its coöperating gear for moving the same; Fig. 11 is a top plan view of a track-frame and platen, provided with my improvement in another of its modifications, the same, in this instance, contemplating the shifting of the platen relative to the track-frame; Fig. 12 is an end elevation of the same partly broken away; Fig. 13 is a side elevation of the platen; Fig. 14 is a top plan view of a track-frame and platen, provided with my improvement in a further one of its several forms; the same, in this instance, contemplating the shifting of the track-frame and, thus, of the writing-mechanism, relative to the platen; Fig. 15 is a side elevation of the same; and Fig. 16 is an end elevation, parts thereof being broken away. Fig. 17 is a fragmentary view in side elevation of a foot-operated mechanism for actuating the shiftable member horizontally.

In Fig. 1, the fine-line-adjusting-device is similar to that shown in my previous patents already mentioned, there being employed a relatively stationary block in which turns an adjusting-screw, connected to and controlling the movement of the track-frame. By means of this adjusting-screw, the track-frame may be moved independent of the regular line-spacing-mechanism, for intermediate and fine-line-adjustment.

In the present construction, the block, which I have here designated by A, has a tongue-and-groove connection with the base $a$, whereby it is slidable thereon. Projecting from the top of the block is a pin $A'$, which engages a slot in the lever $A^2$. The lever $A^2$ is pivotally mounted on a post $A^3$ on the base, and carries a pivoted latch $A^4$ which is provided with a beak $A^5$. Incuts $A^6$ are provided in the side of an upstanding post $a^2$ in the base, and a spring $A^7$ holds the latch $A^4$ normally in engagement with one of said incuts, whereby the block A is locked against movement in either direction and the two extreme incuts constitute, also, limit-devices for limiting the extent of movement of the parts. Thus, the adjusting-screw may be operated to shift the track-frame B and position the writing-mechanism with reference to a line or particular space on the work-sheet, so long as the block is locked against movement, and when it is desired to make an insertion, or print an exponent or other character not in normal alinement, the operator moves the latch $A^4$ toward the handle of the lever $A^2$ and against the action of the spring $A^7$, thereby compressing the spring and withdrawing the latch from locking engagement with the incuts in the post $a^2$ on the base-plate. The block is then free for movement in either direction, as the operator desires, by a movement of the lever $A^2$; and, the track-frame may also be moved similarly by the screw C controlling the track-frame. The track-frame hinge connections necessarily are, for such sliding movement, slotted as in my previous constructions.

$A^8$ designates a lug on the base-plate, which carries a plurality of markings X. Coöperating with the markings on the lug $A^8$ is an index-mark or pointer Y on the track, and in this way the operator is enabled to determine the amount of shifting of the track-frame and the relative position thereof.

In Figs. 6 to 10, I have disclosed a slightly different form of construction, but wherein the fine-line-adjusting screw C, as before, is connected to and controls the track-frame B. Gibbed to the track-frame, and slidable thereon, are the racks $B^2$ which control the movement of the printing mechanism for the regular line spacing. On the underside of the racks $B^2$ are formed a plurality of teeth $B'$. $B^3$ is a shaft mounted in the front end of the track-frame, and secured to said shaft are the gears $B^4$ positioned to mesh with the teeth $B'$ on the underside of the racks. $B^5$ is a knurled head on the end of the shaft for operating the same, and $B^6$ is a spring engaging the gear $B^4$ to hold the same normally against movement.

When it is desired to temporarily place the writing-mechanism out of its normal position, the shaft $B^3$ is revolved, turning the gears $B^4$ and moving the racks $B^2$ which movement carries the writing-mechanism out of its alined writing-position, the parts being held in this position by the spring $B^6$ which engages the gear. In this form, as in the form first described, I employ an indicating scale on the base-plate and adjacent the track, and an indicating mark upon the track for coöperation with the scale. In addition, in the form just described, I also use an indicating mark $B^7$ on one of the racks which coöperates with the scale $B^8$ on the adjacent portion of the track-frame, whereby to indicate the extent to which the rack is shifted, and also to show when it has been properly returned to its normal position.

In the form disclosed in Fig. 11, the fine-line-adjusting-screw is connected to and operates upon the track-frame, the same as in the two forms already described. In this modification, however, instead of providing means for giving the track-frame an additional movement, or for moving the racks on the frame, I employ devices for imparting a longitudinal movement to the platen whereby it may be shifted relative to the track-frame and writing-mechanism. In this instance, the platen-hinges are slotted as shown at $C'$ to permit of a sliding movement. The work holding-clamp $C^2$ is carried by brackets $C^3$ secured directly to the platen, instead of attaching the work-clamps to the track-frame as in the previous constructions. Carried by the platen is a pin $C^4$ which engages a slotted portion in the lever $C^5$. The lever $C^5$ is pivotally mounted on a post $C^6$ of the base-plate, and is held in normal position by a spring $C^7$. A pin $C^8$ is mounted on the base-plate and acts as a stop to limit the movement of the lever $C^5$.

By operating the lever $C^5$, the platen may be moved in either direction to move the work, momentarily or temporarily, out of its normal alined position relative to the track-frame and printing-mechanism, the spring, already mentioned, acting to return the parts immediately to normal position.

The platen carries an indicator $C^9$, which coöperates with an indicating scale $C^{10}$ on a portion of the base-plate for enabling the operator to determine the amount of shifting of the platen relative to the track-frame and printing-mechanism.

In the form of construction illustrated in Figs. 14 to 16, I provide a single mechanism which is capable of performing the functions of both the fine-line-adjust-screw and the temporary intermediate-line-adjusting-device combined, the parts for performing these different functions being integral and inseparable.

Mounted in the base of the machine is a shaft D which is provided with gears $D'$ adapted to mesh with teeth $d$ cut in the underside of the track-frame. The shaft D carries a knurled head $D^2$, by which it may be turned to operate the track-frame, either for the fine-line-adjustment, or for the temporary intermediate-line-adjustment. Instead of the knurled head $D^2$, I may employ an arm attached to the shaft and connected up with a foot treadle, or other lever, to operate the shaft, this also being applicable as well to the construction shown in Figs. 6, 7, 8, 9, and 10. In order to lock the track-frame against movement, while operating the writing-mechanism, I may employ a set screw $D^3$, arranged to engage the shaft D in its bearings and prevent movement thereof, although any other suitable means for accomplishing the same end may be employed without departing from the essential idea here involved. An indicating scale $D^4$, and indicator $D^5$, are provided in this form, as in the other forms already set forth in detail.

In either or all of the modifications herein described, I wish it to be understood that I may employ a track-frame either tiltable, or capable of only a horizontal movement, and also a platen which likewise may be capable of tilting on its support or movable only in a horizontal direction.

I have shown and described my invention in several of its preferred forms, suggestive of the range of its application, and do not limit myself to any one or all of the precise constructions here set forth.

Other changes and modifications may be adopted without departing from the spirit of my invention and, as such, are to be comprehended within the scope of the present improvement, which contemplates the relative shifting momentarily or temporarily of the supporting members of a typewriter, that is, the platen (which constitutes the support for the work-sheet); or of the base-frame (which constitutes the support for the printing-mechanism) or of some movable part of said track-frame; or of both platen and track-frame relatively,—whereby the line-printing position of the printing-mechanism or the printing-point on the platen may be momentarily or temporarily shifted to permit writing at a point abnormal to the regular writing line.

It is to be understood that my present invention is, generally speaking, for shifting momentarily, that is, only for the moment, as distinguished from a changing of the relative position of the parts as may be necessary to bring the operative parts into position to write at a particular point on the sheet, and from which point the regular line-spacing continues. As the shifting movement, referred to, is for a position, primarily, at which exponents, etc., are written in juxtaposition to a letter character, etc., I have, in some instances, in the claims, referred to such position as "exponent position," or by descriptive expressions of similar import to distinguish from a fine-line adjustment.

What I desire to secure by Letters-Patent, and claim is—

1. In a flat-platen typewriting-machine, the combination with track-rails and a platen, means for effecting a momentary-longitudinal-exponent-positioning adjustment of one of said elements relatively away from the normal printing-line and for returning said element to normal position.

2. In a typewriting-machine, the combination with a support for printing-mechanism, and a platen, means for obtaining a relative movement therebetween for the purpose of intermediate-fine-line adjustment, and means for obtaining a temporary relative movement between the platen and said support independently of the intermediate-fine-line adjustment.

3. In a flat-platen typewriting-machine, the combination with a track-frame and a platen, of means for obtaining a movement of said track-frame relatively to the platen for intermediate-fine-line adjustment, and means for effecting temporary-relative-exponent-positioning movement between the track-frame and platen independently of said intermediate-fine-line adjusting means.

4. In a flat-platen typewriting-machine, the combination with a frame and a platen, of means for obtaining movement of the frame for intermediate-fine-line-adjustment, and means for effecting temporary adjustment of one of said elements relatively to the other for exponent-writing.

5. In a typewriter, the combination with a platen, a support arranged in juxtaposition thereto and including guide-rails, means for shifting one of said elements out of normal position to any of a plurality of operative positions to change its relation with respect to the other element, independent means for automatically returning the shifted element to normal position, and an indicating instrumentality for indicating to the operator the position or degree of shift of said shifted element.

6. In a typewriter, the combination with a platen, a support arranged in juxtaposition thereto and including guide rails, means including a lever connecting with one of said elements for shifting it out of normal position to any of a plurality of operative positions to change its relation with respect to the other element, independent means for automatically returning the shifted element to normal position, and an indicating instrumentality for indicating to the operator the position or degree of shift of said shifted element.

7. In a typewriter, the combination with a platen, a support arranged in juxtaposition thereto and including guide-rails, means including a lever connecting with one of said elements for shifting it out of normal position to any of a plurality of operative positions to change its relation with respect to the other element, independent means including a spring for automatically returning the shifted element to normal position, and an indicating instrumentality for indicating to the operator the position or degree of shift of said shifted element.

8. In a typewriter, a work-support, a guide-rail juxtaposed thereto, and means for shifting said rail relatively to said work-support and including a lever disposed independently of either of said elements but operatively connecting with one of them.

9. In a typewriter, a work-support, a guide-rail juxtaposed thereto, means for shifting said rail relatively to said work-support and including a lever disposed independently of either of said elements but operatively connecting with one of them, and independent means for re-shifting said element to normal position.

10. In a typewriter, the combination with a flat-platen, a support arranged in juxtaposition thereto and including guide-rails, means for horizontally shifting one of said elements out of normal position to any of a plurality of operative positions to change the relation of said element with respect to the other element, and independent means for automatically returning the shifted element to normal position.

11. In a typewriter, the combination with a flat-platen, a support arranged in juxtaposition thereto and including guide-rails, means for horizontally shifting one of said elements out of normal position to any of a plurality of operative positions to change the relation of said element with respect to the other element, independent means for automatically returning the shifted element to normal position, and an indicating instrumentality for indicating to the operator the position or degree of shift of said shifted element.

In testimony whereof, I affix my signature, in the presence of two subscribing witnesses.

GEORGE W. DONNING.

Witnesses:
HARRY T. ANDREW,
W. L. BILLMYER.